(12) United States Patent
Yamasaki

(10) Patent No.: US 8,015,965 B2
(45) Date of Patent: Sep. 13, 2011

(54) FUEL VAPOR STORAGE CANISTER, FUEL VAPOR ADSORBENT FOR CANISTER, AND METHOD OF PRODUCING FUEL VAPOR ADSORBENT

(75) Inventor: Koji Yamasaki, Tsurugashima (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 0 days.

(21) Appl. No.: 12/170,717

(22) Filed: Jul. 10, 2008

(65) Prior Publication Data

US 2009/0013973 A1    Jan. 15, 2009

(30) Foreign Application Priority Data

Jul. 12, 2007  (JP) ................. 2007-182947

(51) Int. Cl.
  *F02M 33/02*    (2006.01)

(52) U.S. Cl. ........................................ 123/519

(58) Field of Classification Search ............ 123/519, 123/198 D, 520, 521; 520/400–439; 96/108, 96/132, 134, 333
See application file for complete search history.

(56) References Cited

U.S. PATENT DOCUMENTS

| | | | | |
|---|---|---|---|---|
| 5,564,398 | A * | 10/1996 | Maeda et al. | 123/520 |
| 6,228,803 | B1 * | 5/2001 | Gadkaree et al. | 502/416 |
| 6,976,478 | B2 * | 12/2005 | Kato et al. | 123/519 |
| 2005/0217645 | A1 * | 10/2005 | Fukaya et al. | 123/519 |
| 2007/0012298 | A1 * | 1/2007 | Nakamura et al. | 123/509 |
| 2009/0209418 | A1 * | 8/2009 | Watanabe et al. | 502/405 |

FOREIGN PATENT DOCUMENTS

| | | | |
|---|---|---|---|
| JP | 2-19570 | Y2 | 5/1990 |
| JP | 2000-303917 | A | 10/2000 |
| JP | 2004-225550 | A | 8/2004 |
| JP | 2005-171797 | A | 6/2005 |

* cited by examiner

*Primary Examiner* — Erick Solis
*Assistant Examiner* — Sizo B Vilakazi
(74) *Attorney, Agent, or Firm* — Foley & Lardner LLP

(57) ABSTRACT

A fuel vapor storage canister for adsorbing fuel vapor evaporated from a fuel tank of an automotive vehicle. The fuel vapor storage canister includes a casing provided with charge and purge ports at its first end and an atmospheric port at its second end. At least first and second fuel vapor adsorbent layers are respectively located near the first and second ends of the casing. In this arrangement, the first fuel vapor adsorbent layer is larger in cross-sectional area perpendicular to flow direction of fuel vapor than the second fuel vapor adsorbent layer. The first and second fuel vapor adsorbent layers respectively include first and second granular fuel vapor adsorbents. The first granular fuel vapor adsorbent has a microporous structure, while the second granular fuel vapor adsorbent has a macroporous structure.

3 Claims, 3 Drawing Sheets

FUEL VAPOR STORAGE CANISTER, FUEL VAPOR ADSORBENT FOR CANISTER, AND METHOD OF PRODUCING FUEL VAPOR ADSORBENT

BACKGROUND OF THE INVENTION

This invention relates to improvements in a fuel vapor storage canister serving as a fuel vapor treatment device for adsorbing fuel evaporated, for example, in a fuel tank of an automotive vehicle in order to combust the fuel in an engine during operation of the engine, fuel vapor adsorbent used in the fuel vapor storage canister, and a method of producing the fuel vapor adsorbent.

As is well known, a fuel vapor storage canister has been generally used as a fuel vapor treatment device in order to suppress release of fuel vapor generated within a fuel tank to atmospheric air in a gasoline-fueled automotive vehicle. This canister includes a casing formed thereinside a gas passage which is filled with a fuel vapor adsorbent such as activated carbon. Charge and purge ports for fuel vapor are communicated with one end of the gas passage, while an atmospheric port (drain port) for fuel vapor is communicated with the other end of the gas passage, thus accomplishing so-called charging. During stopping of the vehicle, fuel vapor generated from the fuel tank is introduced through the charge port into the canister and adsorbed by the adsorbent. During operation of an engine, atmospheric air is introduced through the atmospheric port to purge fuel vapor in the canister upon desorbing fuel vapor adsorbed in the adsorbent, and carries the purged fuel vapor to an intake system of the engine through the purge port so that the carried fuel vapor is combusted within the engine, thus accomplishing a so-called purging. By the desorption of fuel vapor under such purging, a fuel vapor adsorbing performance of the canister can be revived thereby allowing the adsorbent to repeatedly adsorb fuel vapor.

In the canister using the above-mentioned activated carbon, the adsorption of fuel vapor is carried out under so-called exothermic reaction so that the temperature within the canister rises with adsorption of fuel vapor thereby degrading the fuel vapor adsorbing performance of the canister. To the contrary, the desorption of fuel component (resulting from fuel vapor) which has been once adsorbed in the activated carbon is carried out under so-called endothermic reaction so that the temperature within the canister lowers with desorption of fuel component thereby degrading a fuel vapor desorbing performance of the canister. Such phenomena is well known.

Accordingly, a variety of conventional fuel vapor storage canisters have been proposed for the purpose of improving the above adsorbing and desorbing performances of the canisters.

Japanese Utility Model Publication No. 2-19570 proposes that the particle diameter of activated carbon becomes larger as the position of the activated carbon becomes nearer to the purge port of a canister. Japanese Patent Provisional Publication No. 2000-303917 proposes that activated carbon having relatively large particle diameters are disposed in a section near the charge and purge ports while activated carbon having relatively small particle diameters are disposed in a section near the atmospheric air port. Conversely, Japanese Patent Provisional Publication No. 2004-225550 proposes that activated carbon having relatively small particle diameters are disposed in a section near the charge and purge ports while activated carbon having relatively large particle diameters are disposed in a section near the atmospheric air port. Additionally, Japanese Patent Provisional Publication No. 2005-171797 proposes that at least one of particle diameter and pore diameter of activated carbon is positively changed at positions in flow direction of fuel vapor.

SUMMARY OF THE INVENTION

In the conventional techniques as disclosed in the above Patent Publications, the particle diameter and/or the pore diameter of activated carbon filled in the casing of the canister are positively changed according to the positions in flow direction of fuel vapor; however, a premise is such that the cross-sectional area of the inside of the casing itself, i.e., passage area for fuel vapor in the canister is basically constant, and therefore fuel vapor cannot be sufficiently restrained from leaking through the atmospheric air port since the atmospheric air port is opened to the atmospheric air.

Furthermore in the above conventional techniques, for example, in case that the particle diameter of activated carbon located near the atmospheric air port is positively increased, a flow resistance (pressure drop) of the canister can be lowered; however, the speed of adsorption and desorption of fuel vapor to activated carbon is lowered with such an increase in particle diameter of activated carbon, thereby not necessarily improving the adsorbing and desorbing performances to expected levels.

In view of the above, an object of the present invention is to provide improved fuel vapor storage canister, fuel vapor adsorbent and production method for the fuel vapor adsorbent, which can overcome drawbacks encountered in the above conventional techniques.

Another object of the present invention is to provide improved fuel vapor storage canister, fuel vapor adsorbent and production method for the fuel vapor adsorbent, which makes it possible to sufficiently restrain fuel vapor from leaking through an atmospheric air port through which atmospheric air is introduced into the canister.

A further object of the present invention is to provide improved fuel vapor storage canister, fuel vapor adsorbent and production method for the fuel vapor adsorbent, which makes it possible to improve fuel vapor adsorbing and desorbing performances of the canister over conventional fuel vapor storage canisters.

An aspect of the present invention resides in a fuel vapor storage canister comprising a casing defining thereinside an elongate space through which fuel vapor flows, the casing having first and second ends which are opposite to each other, the casing having charge and purge ports for fuel vapor, the charge and purge ports being connected to the first end of the gas passage, and an atmospheric port though which atmospheric air is introduced into the casing, the atmospheric air port being connected to the second end of the casing. At least first and second fuel vapor adsorbent layers are formed in the elongate space and respectively located near the first and second ends of the casing. In this arrangement, the first fuel vapor adsorbent layer being larger in cross-sectional area perpendicular to flow direction of fuel vapor than the second fuel vapor adsorbent layer, the first and second fuel vapor adsorbent layers respectively including first and second granular fuel vapor adsorbents, the first granular fuel vapor adsorbent having a microporous structure, the second granular fuel vapor adsorbent having a macroporous structure.

Another aspect of the present invention resides in fuel vapor adsorbents used for a fuel vapor storage canister of an automotive vehicle, comprising small granular fuel vapor adsorbent having a microporous structure; and large granular fuel vapor adsorbent which is larger in size than the small granular fuel vapor adsorbent, the large granular fuel vapor adsorbent having the microporous structure and a macroporous structure which has pores larger in diameter than pores of the microporous structure. The large granular fuel vapor adsorbent is produced by a process including mixing powdery activated carbon, a material which is solid at ordinary temperature and able to evaporate, sublime or decompose at temperatures made during baking, and a binder to form a mixture; forming the mixture into a shape; and baking the formed mixture.

A further aspect of the present invention resides in a method of producing granular fuel vapor adsorbent to be used for a fuel vapor storage canister, the granular fuel vapor adsorbent having a microporous structure and a macroporous structure. The method comprises (a) mixing powdery activated carbon, at least one selected from the group consisting of bentonite, silica sol and alumina sol, serving as a binder, a powdery material which is solid at ordinary temperature and able to evaporate, sublime or decompose at temperatures made during baking, and water to form a mixture; (b) forming the mixture into a cylindrical shape; and (c) baking the formed mixture after drying.

A still further aspect of the present invention resides in a method of producing large granular fuel vapor adsorbent to be used together with small granular fuel vapor adsorbent for a fuel vapor storage canister, the large granular fuel vapor adsorbent being disposed together with the small granular fuel vapor adsorbent in a casing of the fuel vapor storage canister, the large granular fuel vapor adsorbent being larger in size than the small granular fuel vapor adsorbent, the large granular fuel vapor having a microporous structure and a macroporous structure. The method comprises (a) mixing powdery activated carbon, at least one selected from the group consisting of bentonite, silica sol and alumina sol, serving as a binder, a powdery material which is solid at ordinary temperature and able to evaporate, sublime or decompose at temperatures made during baking, and water to form a mixture; (b) forming the mixture into a cylindrical shape; and (c) baking the formed mixture after drying.

DETAILED DESCRIPTION OF THE INVENTION

Figure 1:
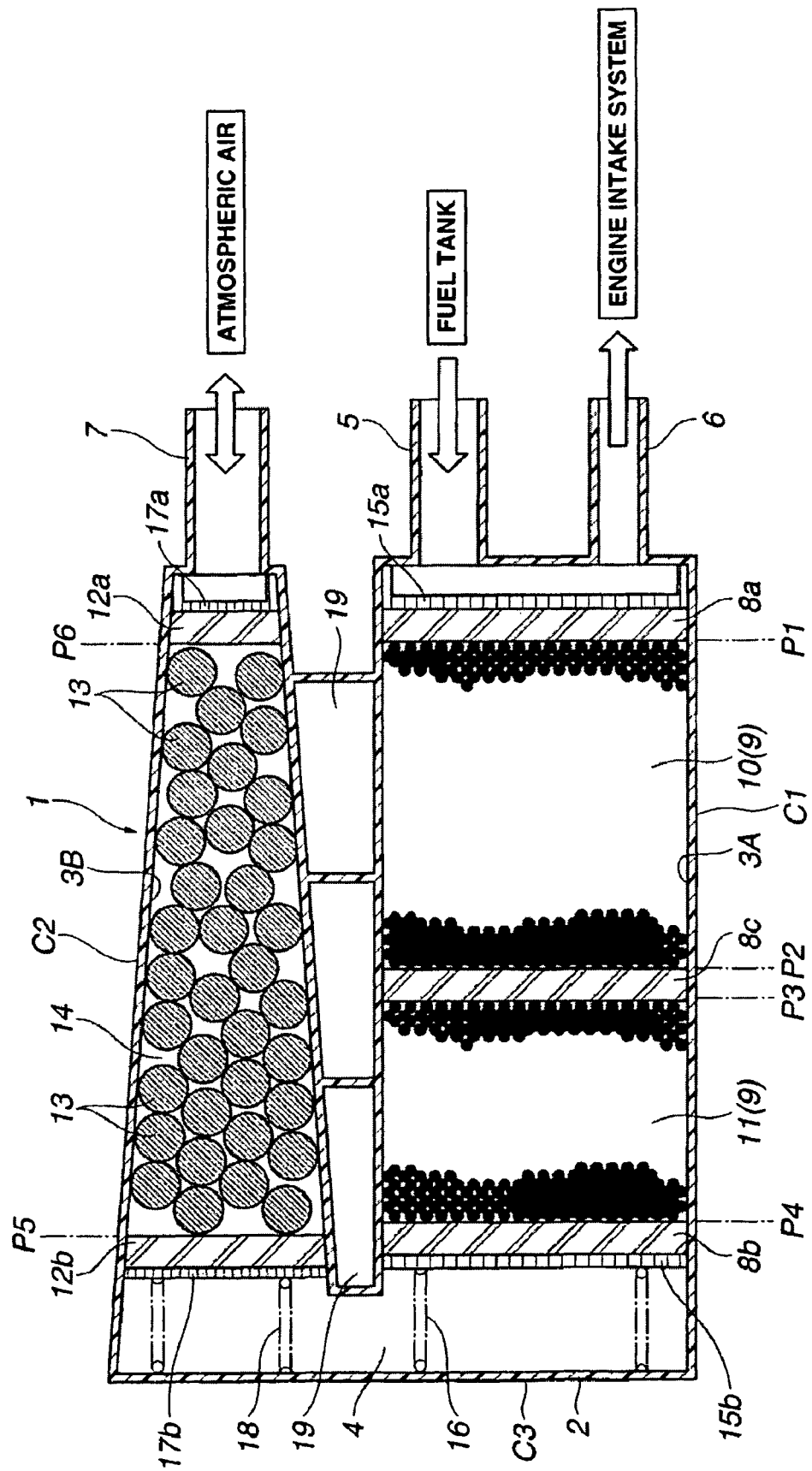
FIG. 1 is a vertical cross-sectional view of a first embodiment of a fuel vapor storage canister according to the present invention.

Referring now to FIG. 1 of the drawings, a first embodiment of a closed-type fuel vapor storage canister 1 according to the present invention is illustrated. The fuel vapor storage canister 1 of this embodiment is mounted on an automotive vehicle provided with an internal combustion engine. The canister 1 is of a so-called two-chamber and U-turn flow structure and comprises a casing 2 as a main body, formed of a resin material or plastic such as polyamide resin. The casing 2 includes first and second cylindrical sections C1. C2 which respectively define thereinside main and auxiliary chambers 3A, 3B which are separate from each other. The main chamber 3A is larger in volume than the auxiliary chamber 3B. The maim chamber 3A is, for example, prism-shaped, and the auxiliary chamber 3B is, for example, of the shape of a frustum of pyramid so as to be tapered in cross-section along its length. The main and auxiliary chambers 3A, 3B are in communication with each other through a communication chamber 4 formed inside a bottom section C3 of the casing 2. Thus, the main chamber 3A, the communication chamber 4 and the auxiliary chamber 3B are connected in series with each other to form a generally U-shaped elongate space (no numeral) inside the casing. Fuel vapor flows though the elongate space in a direction of from the main chamber 3A to the auxiliary chamber 3B or in an opposite direction of from the auxiliary chamber 3B to the main chamber 3A.

The first cylindrical section C1 is provided at its one end with a charge port 5 connected to a fuel tank of the vehicle. The charge port 5 is formed in direct communication with an end portion of the main chamber 3A, so that fuel vapor from a fuel tank is introduced through the charge port 5 into the main chamber 3A. Additionally, the first cylindrical section C1 is provided with a purge port 6 connected to the side of an intake system of the engine. The purge port 6 is formed in direct communication with the end portion of the main chamber 3A and located adjacent the charge port 5, so that fuel vapor purged from the main chamber 3A under introduction of atmospheric air into the main chamber 3A is returned through the purge port 6 into the side of the engine intake system. The second cylindrical section C2 is provided at its one end with an atmospheric air port (or drain port) 7 formed in direct communication with an end portion of the auxiliary chamber 3B, in which atmospheric air is introduced through the atmospheric port 7 into the auxiliary chamber 3B.

In the main chamber 3A, a plurality of (three) filters 8a, 8b, 8c are disposed separate from each other in such a manner that the peripheral portion of each filter fits the inner wall surface of the cylindrical section C1, thereby defining fuel vapor adsorbent layers 10, 11 each of which is located between the adjacent filters. Each filter 8a, 8b, 8c is sheet-shaped and formed of a gas-permeable material such as non-woven fabric or the like. Each fuel vapor adsorbent layer 10, 11 is filled with relatively small granular fuel vapor adsorbent 9. In the auxiliary chamber 3b, a plurality of (two) filters 12a, 12b are disposed separate from each other in such a manner that the peripheral portion of each filter fits the inner wall surface of the cylindrical section C2, thereby defining a fuel vapor adsorbent layer 14 located between the filters 12a, 12b. Each of the filters 12a, 12b is sheet-shaped and formed of a gas-permeable material such as non-woven fabric. The fuel vapor adsorbent layer 14 is filled with relatively large granular fuel vapor adsorbent 13 which has particle sizes (diameters) of several times of those of the small granular fuel vapor adsorbent 9.

In the main chamber 3A, rigid and air-permeable grids 15a, 15b are respectively disposed in contact with the filters 8a, 8b. The grid 15a is located axially outside the filter 8a so as to back up or support the filter 8a. The grid 15b is located axially outside the filter 8b and faces the bottom wall of the bottom section C3. A compression coil spring 16 is disposed between the grid 15b and the bottom wall of the bottom section C3 thereby biasing the grid 15b in a direction far from the bottom wall of the bottom section C3, so that whole the small granular fuel vapor adsorbent 9 of each fuel vapor adsorbent layer 10, 11 is compressed and maintained with a suitable elastic force. Thus, by providing filters 8a, 8b and the grids 15a, 15b at the outside of the fuel vapor adsorbing layers 10, 11, the small granular fuel vapor adsorbent 9 can be prevented from leaking to the side of the charge and purge ports 5, 6 and to the side of the communication chamber 4. Additionally, by applying the force of the compression coil spring 16 to the small fuel vapor adsorbent 9 forming the fuel vapor adsorbent layers 10, 11, the small granular fuel vapor adsorbent 9 can be prevented from its superfluous movement or dancing phenomena within the casing 2. It will be understood that such functions and effects are the same on the side of the auxiliary chamber 3B because, in the auxiliary chamber 3B, rigid and air-permeable grids 17a, 17a are respectively disposed in contact with the filters 8a, 8b and axially outside the filters 12a, 12b while a compression coil spring 18 is disposed between the grid 17a and the bottom wall of the bottom section C3.

It is to be noted that a cross-sectional area (perpendicular to the flow direction of fuel vapor or to axial direction of the casing 2) of the auxiliary chamber 3B is set to be smaller than that of the main chamber 3A upon taking account of difference between the particle size of the small granular fuel vapor adsorbent 9 of the fuel vapor adsorbent layers 10, 11 in the main chamber 3A and that of the large granular fuel vapor adsorbent 13 of the fuel vapor adsorbing layer 14 in the auxiliary chamber 3B. Additionally, since the auxiliary chamber 3B is of the shape of a frustum of pyramid, the cross-sectional area (perpendicular to the flow direction of fuel vapor) of the auxiliary chamber 3B is set to continuously and gradually decrease toward the side of the atmospheric air port 7.

The first and second cylindrical sections C1, C2 of the casing 2 are fixedly connected to each other with bulkhead-like ribs 19.

The small granular fuel vapor adsorbent 9 forming the fuel vapor adsorbent layers 10, 11 in the main chamber 3A is, for example, wood-based or coal-based formed activated carbon or pulverized activated carbon having a particle size (diameter) of about 2 mm. The formed activated carbon is prepared by forming powdery activated carbon into a mass having a certain size or by granulating powder activated carbon, in which binder may be used or not used. The small granular fuel vapor adsorbent 9 formed of the formed activated carbon or the pulverized activated carbon takes a so-called microporous structure having many fine pores with diameters, for example, ranging from not less than 1 nm to less than 100 nm.

The large granular fuel vapor adsorbent 13 forming the fuel vapor adsorbent layer 14 in the auxiliary chamber 3B is, for example, wood-based or coal-based large-granule formed activated carbon having a particle size (diameter) of about 4 mm to about 10 mm. The large-granule formed activated carbon is prepared, for example, by adding, to powdery activated carbon, meltable core material (which is solid at ordinary temperature and vaporizes, sublimes or decomposes at temperatures made during baking discussed after) together with a binder such as bentonite or the like thereby to form a mixture, then by forming the mixture into the shape of cylinder, and finally by baking the formed mixture. It will be understood that the above-mentioned meltable core material is capable of being gasified at temperatures made during the baking discussed after. Each particle of the large-granule formed activated carbon includes many powdery activated carbon particles each of which has fine pores with diameters ranging from not less than 1 nm to less than 100 nm like the above-mentioned small granular fuel vapor adsorbent 9, in which many void channels irregularly exist around the powdery activated carbon particles and three-dimensionally extend among the powdery activated carbon particles, the void channels having a diameter of not smaller than 100 nm. Thus, the large granular fuel vapor adsorbent 14 takes a so-called macroporous structure while the powdery activated carbon particles included in the large granular fuel vapor adsorbent 14 take the microporous structure. It is to be noted that the large granular fuel vapor adsorbent possess both the macroporous structure and the microporous structures. It will be understood that FIG. 1 is drawn upon exaggerating the difference in particle diameter between the small granular fuel vapor adsorbent 9 and the large granular fuel vapor adsorbent 13.

Here, an example of composition and production method of the large granular fuel vapor adsorbent 13 will be discussed.

Market-available coal-based or wood-based activated carbon was pulverized to have particle sizes of not larger than 350 μm (42 mesh pass) so as to be prepared as the powdery activated carbon whose specific surface area is normally within a range of from 500 to 250 $m^2/g$, preferably within a range of from 1000 to 2000 $m^2/g$, more preferably within a range of from 1500 to 2000 $m^2/g$. If the specific surface area is too small, the powdery activated carbon is difficult to obtain a sufficient adsorbing ability. If the specific surface area is too large, the powdery activated carbon cannot obtain a sufficient strength. Additionally, powdery bentonite, for example, having particle diameters of about 1 μm to about 100 μm is prepared as the binder. Furthermore, the meltable core material which is solid at ordinary temperature and vaporizes, sublimes or decomposes at the temperature during the baking is prepared, in which paradichlorobenzene (p-dichlorobenzene) which is a sublimable organic compound is pulverized to obtain paradichlorobenzene powder having particle diameters of not larger than 500 μm (32 mesh pass) to be used as the meltable core material.

Then, 100 parts by weight of the above-mentioned powdery activated carbon, 50 parts by weight of the above-mentioned powdery bentonite as the binder and 400 parts by weight of the above-mentioned powdery paradichlorobenzene as the meltable core material are mixed with each other while a certain amount of water is added, thereby forming a mixture. This mixture is molded into the shape of cylinder (pellet) having a diameter of about 4 mm to about 10 mm and a length of ⅓ to 2 times of the diameter, preferably having a diameter of about 10 mm and a length of about 4 mm, under an extrusion molding or a molding using a metal die, thereby obtaining molded pellets. The molded pellets are dried in a hot-air drying chamber at 115° C. for 6 hours, and then baked at 650° C. for 1 hour in the atmosphere of carbon dioxide by using a rotary kiln or the like, followed by standing the baked molded pellets to cool, thus obtaining the large granular fuel vapor adsorbent 13.

As the binder, silica sol, alumina sol or the like other than the above-mentioned bentonite may be used. In case that bentonite is used as the binder, it is preferable to use sodium bentonite or calcium bentonite from the viewpoint of having a smaller particle diameter.

As the meltable core material, paradichlorobenzene (p-dichlorobenzene) which is a sublimable organic compound is exemplified above; however, naphthalene and camphor are exemplified as similar sublimable organic compounds. These substances possess such a characteristics as to be solid at ordinary temperature and make a phase change to gas at a temperature of not lower than ordinary temperature and of not higher than 200° C. Accordingly, it is the matter of course that the above-mentioned meltable core material may be replaced with other substances having similar characteristics and functions.

Examples of other meltable core material are evaporable oils and fats including petroleum wax, for example, straightchain hydrocarbons such as eicosane and docosane, paraffin wax (for example, products SP-0165 and SP-0145 of Nippon Seiro Co. Ltd.), and the like which are solid at ordinary temperature and have a boiling point of not higher than 400° C. These oils and fats may be used in place of the above-mentioned sublimable organic compound.

Examples of further other metal table core material are decomposable polymer materials such as polyvinyl alcohol, and halogen compounds such as paraffin chloride, tetrabromobisphenol A and the like which are solid at ordinary temperature and decomposable in a certain gas atmosphere at a temperature of not higher than 400° C. These decomposable polymer materials may be used in place of the above-mentioned sublimable organic compound.

The large granular fuel vapor adsorbent 13 produced in a process including the baking as the final step is formed as large particles each of which includes small particles of the powdery activated carbon inherently possessing many fine pores which small particles are combined with each other with the binder as a medium, thereby taking the macroporous structure having a very high void ratio. Thus, the large granular fuel vapor adsorbent 13 is large in both size and void ratio as compared with the small granular fuel vapor adsorbent 9.

It will be understood that at a step where the mixture of the powdery activated carbon, the binder, the meltable core material and water is molded to form the molded pellets, a considerable volume of the molded pellets is occupied with the meltable core material; however, at a baking step after the above molding step, the meltable core material vaporizes, sublimes or decomposes so as to substantially vanish. As a result, the large granular fuel vapor adsorbent 13 is formed with many pores (so-called macropores) which have diameters of not less than 100 nm and are formed or left as traces upon vanishing of the meltable core material owing to vaporization, sublimation or decomposition of the meltable core material, in addition to many pores (so-called micropores) which inherently exist in the powdery activated carbon and have diameters ranging from not smaller than 1 nm to less than 100 nm. Thus, the large granular fuel vapor adsorbent 13 is formed as a structure which is large in both size and void ratio as compared with the small granular fuel vapor adsorbent 9.

The many pores having diameters ranging from not smaller than 1 nm to less than 100 nm and based on the microporous structure serve to trap fuel vapor at molecular level, while the many pores having diameters of not smaller than 100 nm and based on the macroporous structure are too large to trap fuel vapor at molecular level and therefore serve to ensure the specific surface area of each particle of the large granular fuel vapor adsorbent 13 as large as possible while exhibiting the function as passages through which fuel vapor passes.

Operation of the fuel vapor storage canister 1 arranged above will be discussed.

During stoppage of the vehicle, fuel vapor evaporated from the fuel tank is introduced through the charge port 5 into the casing 2 of the canister 1 so as to be adsorbed in the small granular fuel vapor adsorbent 9 forming the fuel vapor adsorbent layers 10, 11 in the main chamber 3A and additionally by the large granular vapor adsorbent 13 forming the fuel vapor adsorbent layer 14 in the auxiliary chamber 3B, thus accomplishing so-called charging.

During operation of the engine, air suction is made through the canister 1 so that atmospheric air is introduced through the atmospheric air port 7. The thus introduced atmospheric air passes through the inside of the casing 2 and sucked through the purge port 6 into the side of the engine. Under such flow of the introduced atmospheric air, so-called purging is made on the large granular vapor adsorbent 13 forming the fuel vapor adsorbent layers 14 in the auxiliary chamber 3B and on the small granular fuel vapor adsorbent 9 forming the fuel vapor adsorbent layers 10, 11 so that fuel vapor adsorbed in large and small granular fuel vapor adsorbents 13, 9 desorbs and is sucked together with the introduced atmospheric air into the side of the engine intake system, followed by being combusted within the engine. By virtue of such desorption of fuel vapor from the large and small granular fuel vapor adsorbents 13, 9 under the purging, a fuel vapor adsorbing ability of the large and small granular fuel vapor adsorbents 13, 9 revives. Such a mechanism of adsorption and desorption of fuel vapor is basically equivalent to that in conventional technique.

The particle size of the large granular fuel vapor adsorbent 13 forming the fuel vapor adsorbent layer 14 in the auxiliary chamber 3B is set larger several times than that of the small granular fuel vapor adsorbent 9 forming the fuel vapor adsorbent layers 10, 11 in the main chamber 3A. Accordingly, a flow resistance (pressure loss) of gas flowing through the fuel adsorbent layers can be prevented from increasing during the charging and the purging. Additionally, the large granular fuel vapor adsorbent 13 is formed with pores having diameters ranging from not smaller than 1 nm to smaller than 100 nm based on the microporous structure and pores having diameters of not smaller than 100 nm based on the macroporous structure, thereby preventing function and speed of the adsorption and desorption of fuel vapor from degrading though the particle size increases.

Furthermore, as discussed above, the cross-sectional area (perpendicular to the flow direction of fuel vapor) of the auxiliary chamber 3B is set smaller than that of the main chamber 3A, and the cross-sectional area of the auxiliary chamber 3B is gradually reduced toward the side of the atmospheric air port 7 so that the end portion (with which the atmospheric air port 7 is directly communicated) of the auxiliary chamber 3B is the minimum in cross-sectional area. This makes possible to largely suppress leaking of fuel vapor into the outside of the canister 1 through the atmospheric air port 7 particularly during the charging of fuel vapor.

Figure 2:
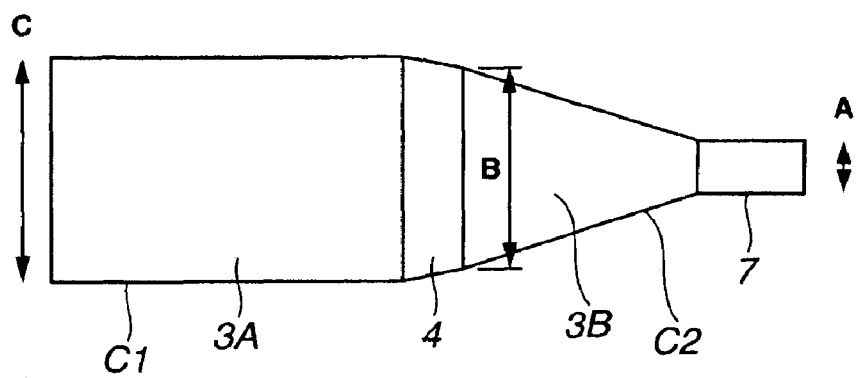
FIG. 2 is a schematic illustration of a modified example of the first embodiment of the fuel vapor storage canister of FIG. 1.

While the casing 2 of the canister 1 of the first embodiment shown in FIG. 1 has been shown and described as being of so-called double-cylinder type wherein the first cylindrical section C1 having the main chamber 3A and the second cylindrical section C2 having the auxiliary chamber 3B are parallel arranged, it will be appreciated that the first and second cylindrical sections C1, C2 may be arranged in series in such a manner as to be aligned with each other. Such an arrangement is similar to that of the first embodiment of FIG. 1 and schematically shown in FIG. 2 which represents the interrelationship between the main chamber 3A in the first cylindrical section C1 and the auxiliary chamber 3B in the second cylindrical section C2 is indicated. In FIG. 2, A is the cross-sectional area (perpendicular to the flow direction of fuel vapor) of the atmospheric air port 7; B is the maximum cross-sectional area (perpendicular to the flow direction of fuel vapor) of the auxiliary chamber 3B; and C is the cross-sectional area (perpendicular to the flow direction of fuel vapor) of the main chamber 3A. In order to attain the purpose of the present invention, it is experimentally preferable that A:B:C is 1:3-15:10-20 on the assumption that A is 1.

Figure 3:
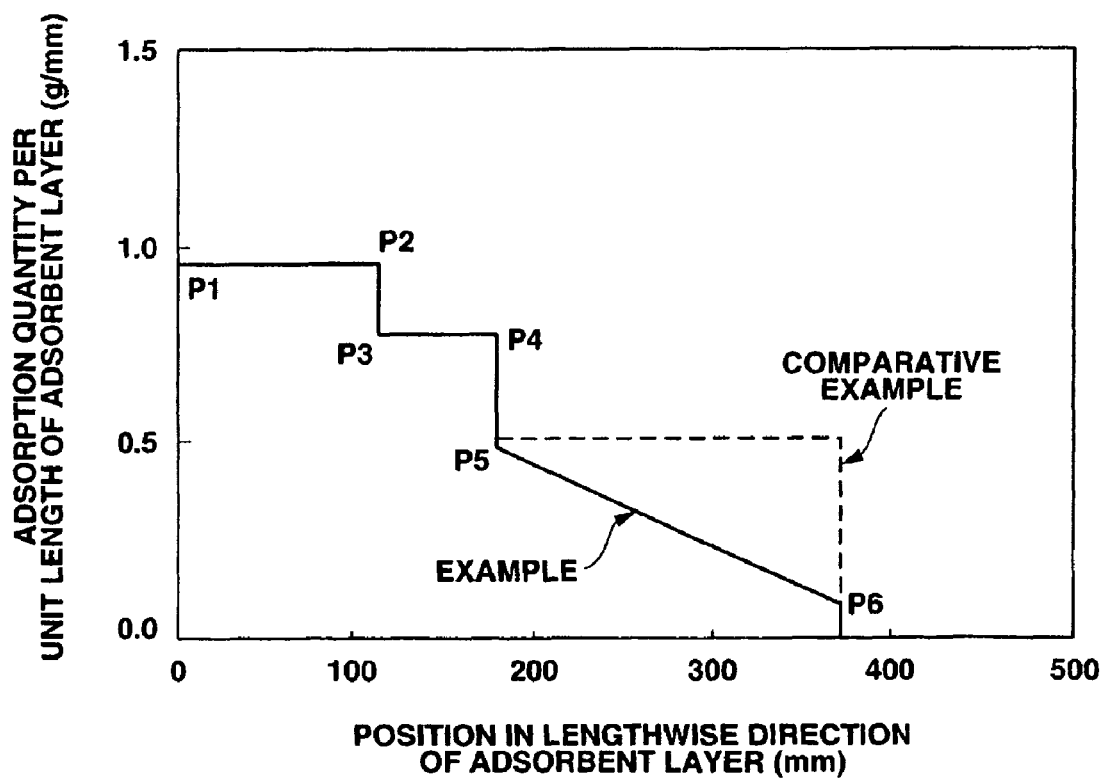
FIG. 3 is a graph showing a distribution of adsorption quantity of fuel vapor in the canister of FIG. 1 in terms of positions in lengthwise direction of adsorbent layers of the canister.

FIG. 3 is a graph showing a distribution of quantity of fuel vapor adsorbed in the fuel vapor adsorbents of the first embodiment canister of FIG. 1, in which the ordinate represents a quantity (adsorption quantity) of fuel vapor adsorbed in the fuel vapor adsorbents per unit length of the adsorbent layer (g/mm) while the abscissa represents positions in lengthwise direction of the adsorbent layers. Data in FIG. 3 were obtained under an experiment in which butane vapor (fuel vapor) was introduced through the charge port 5 into the casing 2 and flown through the elongate space inside the casing 2 at a flow rate of 250±5 ml/min. and at a temperature of 25°±0.2° C. for 900 seconds. It will be understood that positions P1, P2, P3, P4, P5 and P6 correspond respectively to positions indicated by P1, P2, P3, P4, P5 and P6 in FIG. 1. Thus, the data of the first embodiment of FIG. 1 is indicated as a line of "Example" in FIG. 3. In this connection, data indicated as a broken line of "Comparative Example" is for a fuel vapor storage canister which is outside the scope of the present invention and similar to the first embodiment of FIG. 1 with the exception that the auxiliary chamber 3B is of the prism-shaped and has the same cross-sectional area (corresponding to the maximum cross-sectional area of the auxiliary chamber 3B in the first embodiment) throughout its length without taking the shape of a frustum of pyramid, and that the auxiliary chamber 3B is filled with the same fuel vapor adsorbent 9 as in the main chamber 3A.

FIG. 3 depicts that the adsorption quantity distribution of fuel vapor in the canister 1 tends to linearly gradually decrease toward the side of the atmospheric air port 7 particularly in the auxiliary chamber 3B which is formed tapered in cross-section and filled with the large granular fuel vapor adsorbent 13 having particle sizes of several times of the small granular fuel vapor adsorbent 9 in the main chamber 3A.

Figure 4:
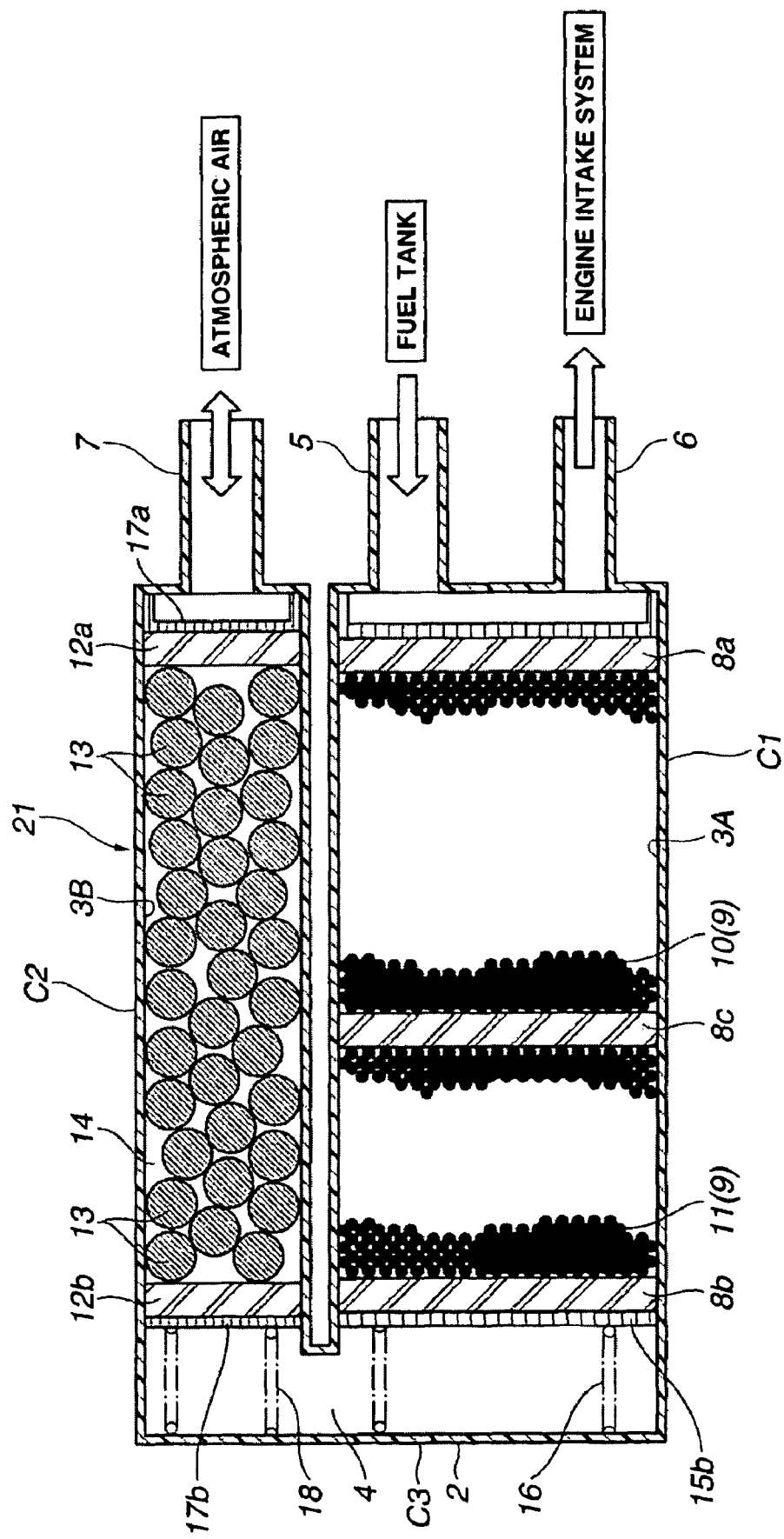
FIG. 4 is a vertical cross-sectional view of a second embodiment of the fuel vapor storage canister according to the present invention.

FIG. 4 illustrates a second embodiment of the fuel vapor storage canister according to the present invention, which is similar to the first embodiment and therefore the corresponding numerals designate the corresponding parts and elements for the purpose of simplicity of illustration. In this embodiment, the auxiliary chamber 3B is of the prism-shaped and has the same cross-sectional area throughout its length. The cross-sectional area (perpendicular to flow direction of fuel vapor) of the auxiliary chamber 3B is smaller than that of the main chamber 3A. It will be appreciated that the fuel vapor storage canister of this embodiment exhibits almost the same effects as those of the fuel vapor storage canister of the first embodiment.

While the large granular fuel vapor adsorbent 13 (before the baking) forming the fuel adsorbent layer 14 in the auxiliary chamber 3B is formed by mixing three elements of the powdery activated carbon, the binder and the meltable core material, it will be appreciated that the large granular fuel vapor adsorbent 13 may be formed by mixing materials (such as powder of aluminum, alumina and/or the like) having a relatively large specific heat as occasion demands, in a certain ratio with the above three elements. If such a high specific heat material as aluminum and/or the like is mixed in the large granular fuel vapor adsorbent 13, the high specific heat material functions to make a positive heat exchange between it and activated carbon thereby softening the temperature change of activated carbon when cooled during the purging or when heated during the charging, because the high specific heat material itself is high in heat storage capacity. This softening the temperature change improves purging and charging efficiencies of the activated carbon because the purging efficiency of activated carbon is lowered when cooled or when heated.

As appreciated from the above, according to the present invention, the cross-sectional area of the fuel vapor adsorbent layer located near the atmospheric air port of the casing of the canister is set larger than that of the fuel vapor adsorbent layer located near the charge and purge ports. This effectively suppresses leaking of fuel vapor through the atmospheric air port at the minimum level. Additionally, the fuel vapor adsorbent forming the fuel vapor adsorbing layer located near the charge and purge ports has the so-called microporous structure, while the fuel vapor adsorbent forming the fuel vapor adsorbing layer located near the atmospheric air port has the so-called macroporous structure in addition to the microporous structure. This suppresses an increase in flow resistance (pressure drop) at the fuel vapor adsorbing layer located near the atmospheric air port while making it possible to hasten fuel vapor adsorption and desorption of the canister, thereby largely improving fuel vapor adsorbing and desorbing performances of the canister.

Further, by disposing the fuel vapor adsorbent layer including the fuel vapor adsorbent having both the microporous and macroporous structures within the auxiliary chamber independent from the main chamber accommodating therein the fuel vapor adsorbent layer including the fuel vapor adsorbent having the microporous structure, the above leaking fuel suppressing effect and fuel vapor adsorbing and desorbing performances improving effect can be further enhanced.

The entire contents of Japanese Patent Application No. 2007-182947, filed Jul. 12, 2007, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel vapor storage canister comprising:
a casing defining thereinside an elongate space through which fuel vapor flows, the casing having first and second ends which are opposite to each other, the casing having charge and purge ports for fuel vapor, the charge and purge ports being connected to the first end of a gas passage, and an atmospheric port though which atmospheric air is introduced into the casing, the atmospheric port being connected to the second end of the casing,
at least first and second fuel vapor adsorbent layers formed in the elongate space and respectively located near the first and second ends of the casing,
wherein the first fuel vapor adsorbent layer being larger in cross-sectional area perpendicular to a flow direction of fuel vapor than the second fuel vapor adsorbent layer, the first and second fuel vapor adsorbent layers respectively including first and second granular fuel vapor adsorbents, the first fuel vapor adsorbent being smaller in particle size than the second fuel vapor adsorbent, the first granular fuel vapor adsorbent having granules with micropores forming a microporous structure, the second granular fuel vapor adsorbent having granules with micropores forming a microporous structure and macropores forming a macroporous structure,
wherein the macropores are connected to the micropores of the second fuel vapor absorbent so that fuel vapor flows between the macropores and the micropores of the second fuel vapor absorbent,
wherein the micropores of the second fuel vapor absorbent having diameters ranging from not smaller than 1 nm to smaller than 100 nm, the macropores having diameters of not smaller than 100 nm.

2. A fuel vapor storage canister as claimed in claim 1, wherein the casing having main and auxiliary chambers which are connected in series with each other to form a major part of the elongate space, the main and auxiliary chambers being defined respectively by the first and second ends of the casing, wherein the main chamber is larger in cross-section perpendicular to flow direction of fuel vapor than the auxiliary chamber, the first and second granular fuel vapor adsorbents being respectively disposed in the main and auxiliary chambers.

3. A fuel vapor storage canister as claimed in claim 2, wherein the cross-sectional area of the auxiliary chamber gradually decreases toward the second end of the casing.

* * * * *